United States Patent
Fisher, Jr. et al.

(10) Patent No.: US 6,718,319 B1
(45) Date of Patent: Apr. 6, 2004

(54) METHOD AND APPARATUS FOR FORMATTING SMART CARDS AND CARD READERS

(75) Inventors: David L. Fisher, Jr., Tega Cay, SC (US); Matthew H. Radcliffe, Potomac, MD (US); Cristina Casimiro-Garcia, Alexandria, VA (US); Jorge Arturo Rivera, Alexandria, VA (US)

(73) Assignee: Strategic Analysis, Incorporated, Arlington, VA (US)

( * ) Notice: Subject to any disclaimer, the term of this patent is extended or adjusted under 35 U.S.C. 154(b) by 971 days.

(21) Appl. No.: 08/984,053

(22) Filed: Dec. 3, 1997

Related U.S. Application Data (60) Provisional application No. 10/032,181, filed on Dec. 3, 1996.

(51) Int. Cl.[7] ............ G06F 17/30; G06F 15/177; G06F 3/00
(52) U.S. Cl. ............ 707/1; 707/104.1; 709/220; 713/1; 710/10
(58) Field of Search ................ 707/101, 102, 707/1, 100, 104.1; 395/712, 651, 653; 235/492, 487, 375, 382.5; 709/220, 221, 222; 713/1; 710/10, 11

(56) References Cited

U.S. PATENT DOCUMENTS

| | | | | |
|---|---|---|---|---|
| 4,805,090 A | * | 2/1989 | Coogan | 395/894 |
| 4,874,935 A | * | 10/1989 | Younger | 235/492 |
| 5,594,233 A | * | 1/1997 | Kenneth et al. | 235/492 |
| 5,655,148 A | * | 8/1997 | Richman et al. | 395/828 |
| 5,748,737 A | * | 5/1998 | Daggar | 380/24 |
| 5,862,351 A | * | 1/1999 | He | 395/284 |
| 5,867,730 A | * | 2/1999 | Leyda | 395/830 |
| 5,870,610 A | * | 2/1999 | Beyda | 395/712 |
| 5,923,884 A | * | 7/1999 | Peyret et al. | 395/712 |

FOREIGN PATENT DOCUMENTS

| | | |
|---|---|---|
| DE | 195 36 548 A | 4/1997 |
| WO | WO 96/19771 | 6/1996 |
| WO | WO 96/36051 | 11/1996 |

OTHER PUBLICATIONS

Clark et al "BITS: A Smartcard Protected Operating System", Communications of the ACM, Nov. 1994, pp. 66–70, 94.*

* cited by examiner

Primary Examiner—Uyen Le
(74) Attorney, Agent, or Firm—Birch, Stewart, Kolasch & Birch, LLP

(57) ABSTRACT

This software tool accessing methodology defines a powerful approach to interacting with smart card readers and smart cards. This software tool embodies the central software engine (Interface component), a series of configuration files, and modular plug-ins that provide methods for formatting cards and compatibility with evolving standards. This software tool enables effective building of smart card solutions without concern for the tedious detail of smart card vendor specifications and the unique interface challenges that exist with smart card readers. Instead of having to hardcode instructions within a smart card application, card and reader information is accessed by the interface component using the data stored in configuration files to therefore create flexibility and growth potential. The configuration files include information that tells how a software engine can communicate with an information system, a reader, and a card. This software tool is a turn-key solution when compared to existing very rudimentary smart card application development tools that require considerable smart card expertise and are limited to a single card or reader type.

20 Claims, 5 Drawing Sheets

METHOD AND APPARATUS FOR FORMATTING SMART CARDS AND CARD READERS

RELATED APPLICATIONS

This application claims priority of the U.S. Provisional Application Ser. No. 60/032,181, filed Dec. 3, 1996.

FIELD OF THE INVENTION

The present invention relates to a card methodology and architecture for configuring a software engine used for creating new smart card applications within a programming environment, and more specifically relates to a software tool and methodology that provides flexibility in formatting and interfacing smart cards, card readers and information systems in an object-oriented application development environment.

BACKGROUND OF THE INVENTION

In the past, many different smart card readers existed and many different smart cards were available. However, while some similarities existed among the various card readers and smart cards, every vender had unique features and capabilities that differentiated their products. This presented a steep learning curve for application developers who had to learn the intricate details regarding how a particular card and card reader functioned. In addition, once an application had been designed, transition across hardware products was very difficult without significant code rewrites. The software tools provided by hardware vendors were either weak or non-existent and thus created the following problems.

For every different reader or card, there existed a unique set of commands. Example commands included: create file, create directory, present secret code, load secret code, reset reader, eject card, etc. Each command had an associated hexadecimal instruction. Addition or variation of commands or instructions created big problems since the instructions were hardcoded within the software engine. For example, a card could have the following commands: create file, write file, present code, and load code. However, if a new command were to be added such as "update code", the entire software engine would have had to have been rewritten. This would have been cumbersome, inconvenient, and time-consuming.

With regard to readers, readers also differed in the way that they communicated with the cards, drew power (battery, host, external), processed commands, and reported status and errors, for example. With regard to the cards, the cards were also very diverse (magnetic stripe cards, memory chip cards such as simple flash memory cards, card operating systems known as COS chip cards with programmable operating systems, and others). Even within the COS family of cards, there were different support elements for directory structures, file allocation and access, encryption, secret codes, status and error messages, etc.

In a system utilizing different smart cards and smart card readers, such a system was quite cumbersome, mostly because of the specialized smart card software that was provided by the hardware manufactures. Many of the tools for creating specialized smart cards to comply with a user's desired specifications were not high-level tools and were not easy to use. The tools did not create any common way to work with different smart cards and readers, and there was no existing development tool that permitted development of an application for different readers and cards.

SUMMARY OF THE INVENTION

A first object of the present application is to overcome the aforementioned drawbacks and to create a smart card software tool useable in an interfacing architecture that allows a user to similarly interface with smart cards and/or card readers despite the source and compatibility standard of each card or reader.

Another object of the present application is to provide a self-configuring software engine usable for communicating with cards and card readers having different formats and for creating and using files, directories or secret codes, for example.

A still further object of the present application is to provide a tool for modifying smart card or card reader commands without the need to re-write an entire software engine.

An even further object of the present application is to create a tool which provides flexibility by allowing the reformatting of a smart card and/or card reader with new information.

These and other objects of the present application are fulfilled by providing a method for communicating with a card and a card reader, comprising the steps of: prestoring a plurality of files for configuring a software tool for communicating with the card as card configuration files; prestoring a plurality of files for configuring a software tool for communicating with the card reader as reader configuration files; selecting a card configuration file; selecting a reader configuration file; storing the selected card configuration file and reader configuration file; and configuring the software tool for communicating with the card and card reader based upon the respective stored selected card and card reader configuration files.

These and other objects of the present application are further fulfilled by providing a method for communicating with a card, comprising the steps of: prestoring a plurality of files for configuring a software tool for communicating with a card; selecting one of the prestored files; storing the selected file; and configuring the software tool for communicating with the card based upon the stored selected file.

These and other objects of the present application are still further fulfilled by providing a method for communicating with a card reader, comprising the steps of: prestoring a plurality of files for configuring a software tool for communicating with a card reader; selecting one of the prestored files; storing the selected file; and configuring the software tool for communicating with the card reader based upon the stored selected file.

These and other objects of the present application are even further fulfilled by providing an apparatus for formatting a card, comprising: a first memory for prestoring a plurality of card configuration files for configuring a software tool for formatting the card; a selection function for selecting one of the prestored card configuration files based upon card type; a dynamic memory for storing the card configuration file selected based upon card type, wherein the software tool is configured based upon the stored card configuration file, the selection function further selects at least one command for formatting the card, and the selected at least one command is stored in memory on the card; and processing function for formatting the card based upon the at least one selected stored command.

These and other objects of the present application are still yet further fulfilled by providing an apparatus for formatting a card reader, comprising: a first memory for prestoring a plurality of card reader configuration files for configuring a software tool for formatting the card reader; a selection function for selecting one of the prestored card reader configuration files based upon card reader type; a dynamic memory for storing the card reader configuration file selected based upon card reader type, wherein the software tool is configured based upon the stored card configuration file, the selection function further selects at least one command for formatting the card reader, and the selected at least one command is stored in memory of the card reader; and a processing function for formatting the card reader based upon the at least one selected and stored command.

These and other objects of the present application are still even further fulfilled by providing an apparatus for formatting a card and a card reader, comprising: a first memory for prestoring a plurality of card configuration files and a plurality of card reader configuration files for configuring a software tool for formatting a card and card reader; a selection function for selecting one of the prestored card configuration files and one of the card reader configuration files based upon respective card and card reader type; a dynamic memory for storing the card and card reader configuration files selected based upon the respective card and card reader type, wherein the software tool is configured based upon at least one of the stored card and card reader configuration files, the selection function further selects at least one command for formatting at least one of the card and card reader, and the selected at least one command for formatting at least one of the card and card reader are stored in memory of the respective card and card reader; and a processing function for formatting at least one of the card and card reader based on the respective selected and stored command.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, wherein like elements are represented by like reference numerals throughout, and wherein.

DETAILED DESCRIPTION OF THE PREFERRED EMBODIMENTS

The disclosed software tool and methodology enable interacting with smart cards and smart card readers. The tool and methodology can be used in well-defined interfacing architectures that are compatible with current and developing standards, and also accommodating to nonstandard products.

Figure 1:
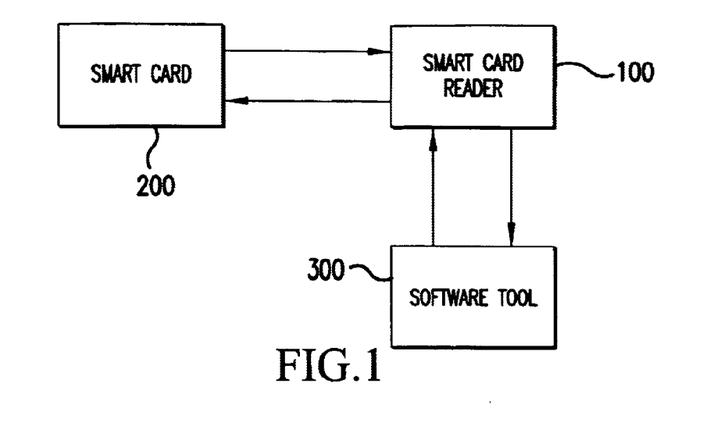
FIG. 1 illustrates an overall block diagram of the software tool, the smart cards and the card reader.

FIG. 1 illustrates the main components of the present application for configuring a software tool, usable for formatting or otherwise communicating with advanced card systems such as smart cards and/or card readers to meet user specification. A software tool 300 allows the user to work with a smart card 200 via a card reader 100 as shown in FIG. 1 for example, and create files, directories, and secret codes to meet a user specification. Basically, the software tool 300 allows the user to create desired smart card software independent of the type of card reader 100 and the smart card 200. In addition, the software tool 300 allows a user to similarly create card reader software for a card reader 100 shown in FIG. 1 for example, independent of the type of smart card 200 and card reader 100. Further, the software tool 300 allows a user to reformat a smart card reader 100 and a smart card 200 with new information.

Figure 2:
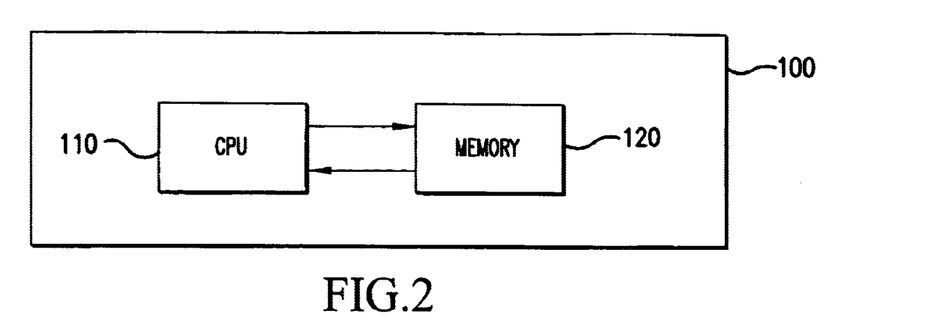
FIG. 2 illustrates the components of the card reader.

FIG. 2 illustrates components of a card reader 100 for example. The card reader 100 can include a central processing unit (CPU) 110 and some type of memory 120. The memory 120 is represented as a single element in FIG. 2 for the sake of brevity, but of course can include an electrically erasable programmable read only memory portion (EEPROM) and a random access memory (RAM) portion.

Many smart card readers 100 connect to the software tool 300 via a RS232 serial port. The readers may be pass-through readers that simply passes communications between the software tool 300 and the card 200. The communication setting for the pass-through reader 100 should be the same as the card 200 protocol. For example, a T=0 transmission protocol card expects 8 data bits, even parity and 2 stop bits. Other readers 100 contain firmware that communicates with the software tool wins the reader protocol and translates the message to the card's protocol. Here, the software tool 300 port is configured to match the reader's protocol. The preferred embodiment of this invention automatically configures itself to match the desired protocol. That is, for a pass-through reader, the software tool 300 is configured to match the expected card protocol. However, for other port readers, the reader protocol is matched.

Figure 3:
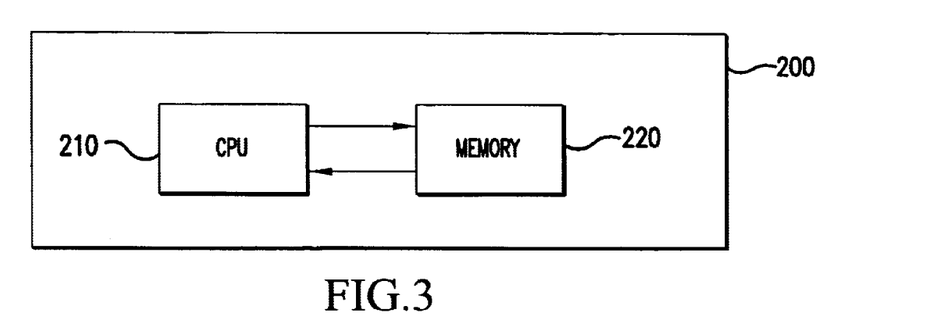
FIG. 3 illustrates the components of the smart card.

FIG. 3 illustrates the basic components of the smart card 200. A smart card, for example, is a card with at least a CPU 210 and memory 220 as shown in FIG. 3. The memory 220 can include an EEPROM portion and a RAM portion similar to that of the card reader 100 shown in FIG. 2 for example. If the card is a chip card that can store data but have little or no processing or internal file allocation capabilities, then data is addressed directly. If the card is based on an internal CPU 210, then processing functions may include directory and file support, multilevel security management and built-in cryptography for encrypting and decrypting secured data. Most cards currently produced have a CPU 210, and are more sophisticated than cards that only store data.

The card methodology of the present invention can be used for a vast array of cards and card readers. For example, the cards can include magnetic stripe cards, memory chip cards, COS chip cards with programmable operating systems, etc. Further, the card readers can include a variety of readers for reading such cards.

Figure 4:
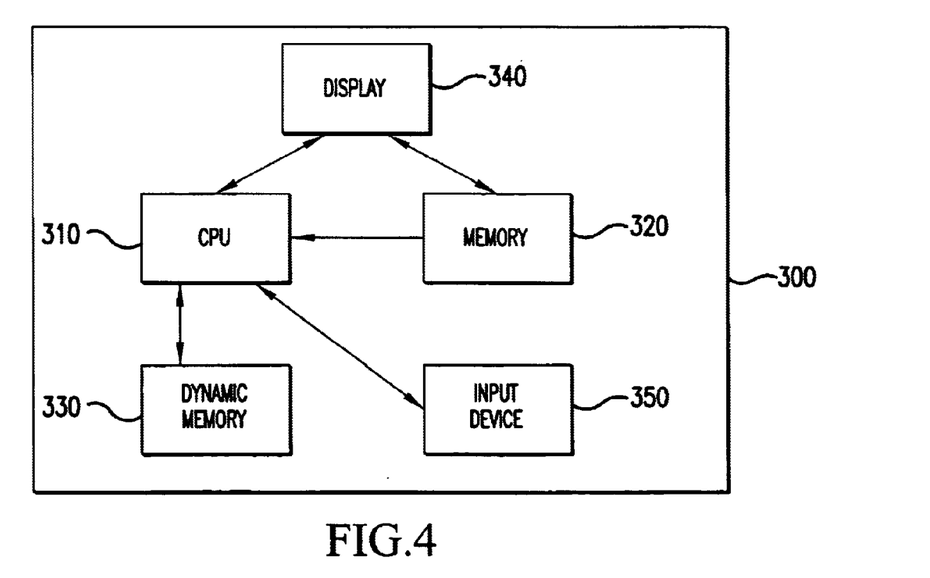
FIG. 4 illustrates the components of the tool for formatting the smart card and card reader.

FIG. 4 illustrates the components of the software tool 300. The software tool 300, in a preferred embodiment, is built upon a standard computer work station. The card methodology is preferably built around a Microsoft Windows library of routines that provide support for interfacing smart cards 200 and card readers 100, wherein the software tool can communicate with and can be used to format smart cards 200 and card readers 100, either singly or in combination. In one preferred embodiment, the Microsoft Window library of routines is in the form of a component for the Delphi Programming Environment. The software tool 300 creates a unique methodology for formatting all types of smart cards 200 and card readers 100 to create interfaceable smart cards 200 and card readers 100 based upon user specification through the creation of a series of configuration files.

The basic components of the software tool 300 include those of a basic computer workstation. A central processing unit 310 is used to control various components including a display 340, a memory 320, an input device 350, and a dynamic memory 330. The memory 320 stores a variety of configuration files including CDC (card) files and RDC (card reader) files for a plurality of card and card reader types. Based upon a particular type of smart card or card reader, a card or card reader configuration file is selected by input device 350 and stored in dynamic memory 330. The software engine of the software tool, being an open engine, is then configured based upon the selected configuration file to permit easy communication with the particular type of card or card reader. Then, based upon desired commands for formatting or otherwise communicating with a smart card 200 or a card reader 100, various commands are selected through input device 350. These selected commands are then formatted and can then be stored in memory 220 and/or 120 to thereby communicate or format a desired smart card 200 and/or card reader 100 based upon user specification.

Configuration files, including both CDC and RDC files, can further be displayed to a user on a display 340, as can a list for formatting or otherwise communicating with a card or card reader. It should be noted that the dynamic memory 330 is merely representative in FIG. 4 and can include both random access memory and read only memory, as can memory 320 of FIG. 4. Basically, the memory 320 designates a memory for prestoring a plurality of files for configuring the "open" engine of the software tool for use with various types of card readers and smart cards, and dynamic memory 330 designates a memory for storing a selected reader and/or smart card configuration file selected based upon card and/or card reader type, wherein an input device 350 is used to select card and/or card reader configuration files and to select various commands for formatting or otherwise communicating with a card and/or card reader. Operation of the EZ card formatting system and method will be explained as follows.

Operation of the system and method for creating easily interfaceable smart cards, card readers and information systems, to create or format a smart card and card reader and in essence configure a variable software engine which communicates with the information system, reader and card, occurs in two phases, a setup phase and an operational phase. In order to configure a software engine of a software tool, for formatting smart card and card reader based on user specification, configuration files are prestored for configuring the software engine based upon various types of smart cards and card readers; a configuration file is selected and stored based upon a type of card or card reader to be formatted; the software tool is configured based upon the selected and stored configuration file; desired commands for formatting or otherwise communicating with the card or reader are selected based upon user specification; and a card and/or card reader are formatted based on the selected card and/or card reader commands.

For every different card or card reader, there is the normally unique set of commands, wherein each command includes an associated instruction. Instead of having to hardcode desired instructions within a software engine, all the commands and instructions are stored in configuration files, including smart card (CDC) configuration files and card reader (RDC) configuration files for various types of cards and card readers. Thus, if a new command is to be introduced, instead of having to rewrite the entire software engine, the system can add a new command and associated instruction configuration files so that a software engine can read in the information and reconfigure itself to work with the appropriate reader and/or card. The basics of the setup phase are as follows.

Figure 5:
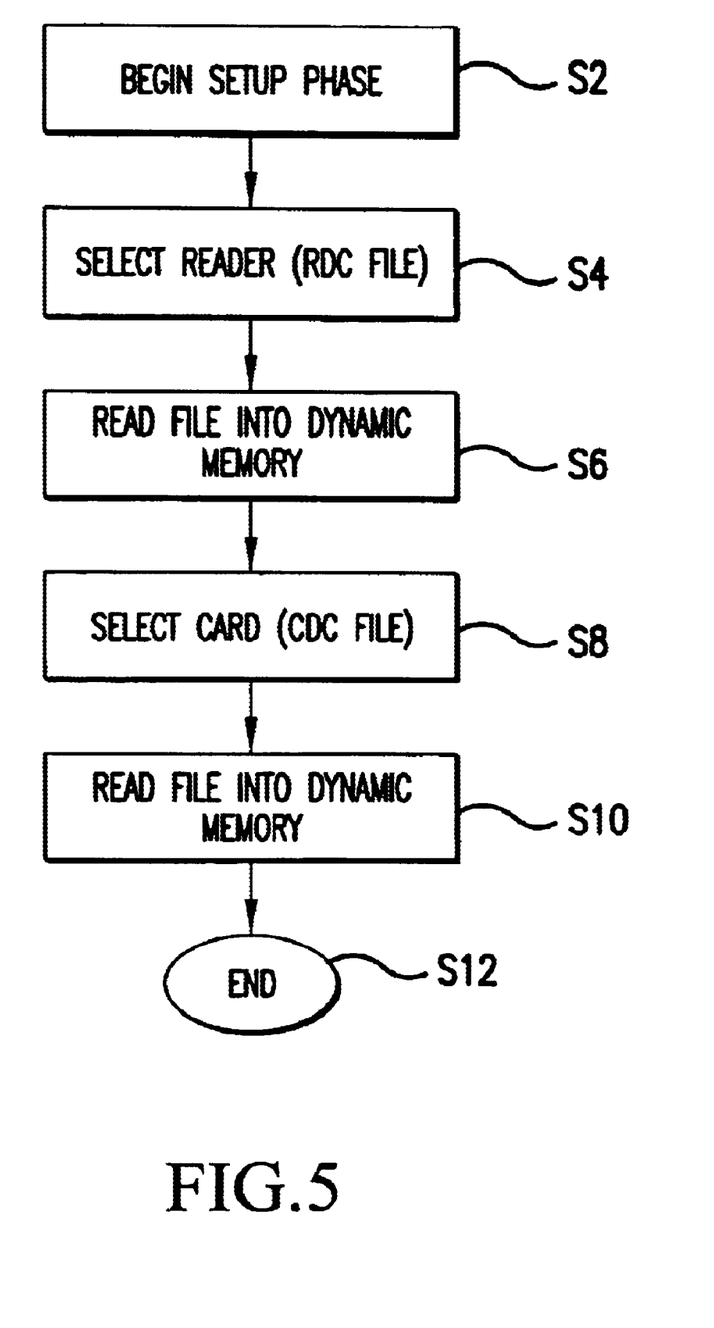
FIG. 5 illustrates a flowchart of the setup phase for configuring the software tool, prior to formatting the smart card and card reader.

As shown in FIG. 5, the setup phase begins at Step S2. At Step S4, if desired, a reader RDC (configuration) file is selected using input device 350. A list of RDC files for various types of readers can be displayed on display 340 for example. Once selected based upon a type of reader in Step S4, the selected configuration file is then read into dynamic memory 330 and stored therein in step S6.

Thereafter, card configuration files are displayed for various types of smart cards. A card configuration file (CDC) for a particular type of smart card to be configured is selected in Step S8. The CDC file of the selected smart card type is then read into dynamic memory in Step S10 and the set up phase for setting up a card and card reader ends in Step S12 of FIG. 5. The open software engine of the software tool 300 is then configured based upon the selected RDC or CDC file to thereby initialize the engine for communication with the selected reader or card.

Accordingly, in the setup phase, the Microsoft Windows library of routines that provide support for interfacing smart cards and readers is populated with information (from a configuration file) specific to a type of smart card or smart card reader to be formatted, namely the library is populated with products specific information. Thus, information specific to a type of smart card and card reader are selected and retrieved from the CDC and RDC configuration files for all types of smart card and card reader products stored in memory 320 (or an external memory). The selected and stored configuration file contains operational parameters (product information, transmission protocol, error handling, command/response processing) as well as details of each supported command. Further data of configuration files includes transmission/reception elements, communication protocol, potential error codes and messages, position in response to strings of key information, and parameters (instruction, unique errors, response information, etc.) for a resupported command. A typical reader that can process five commands and a card that has 20 available commands, would result in approximately 300 values being read from the RDC and CDC configuration files. Reference is made to the CDC and RDC configuration file specification section described hereafter, for guidelines. In short, a configuration file lists in text format, all the data necessary for the component to communicate and operate with the product. Thus, based upon the selected and stored CDC or RDC configuration file, the engine of the software tool can be configured for formatting or otherwise communicating with a card or card reader.

At the beginning of the setup phase in Step S2, the Delphi component as the open software engine is added to the application (the configuration of a system for formatting or communicating with a type of smart card and card reader based on user specification) that is being developed. Next, RDC and CDC files are selected that match the products (type of card and reader) to be used by the application in Steps S4 and S8. After retrieving the information from the appropriate RDC and CDC files, and storing these selected configuration files in dynamic memory 330 in Steps S6 and S10, the engine of the software tool is configured and is ready to control product operation.

Figure 6A:
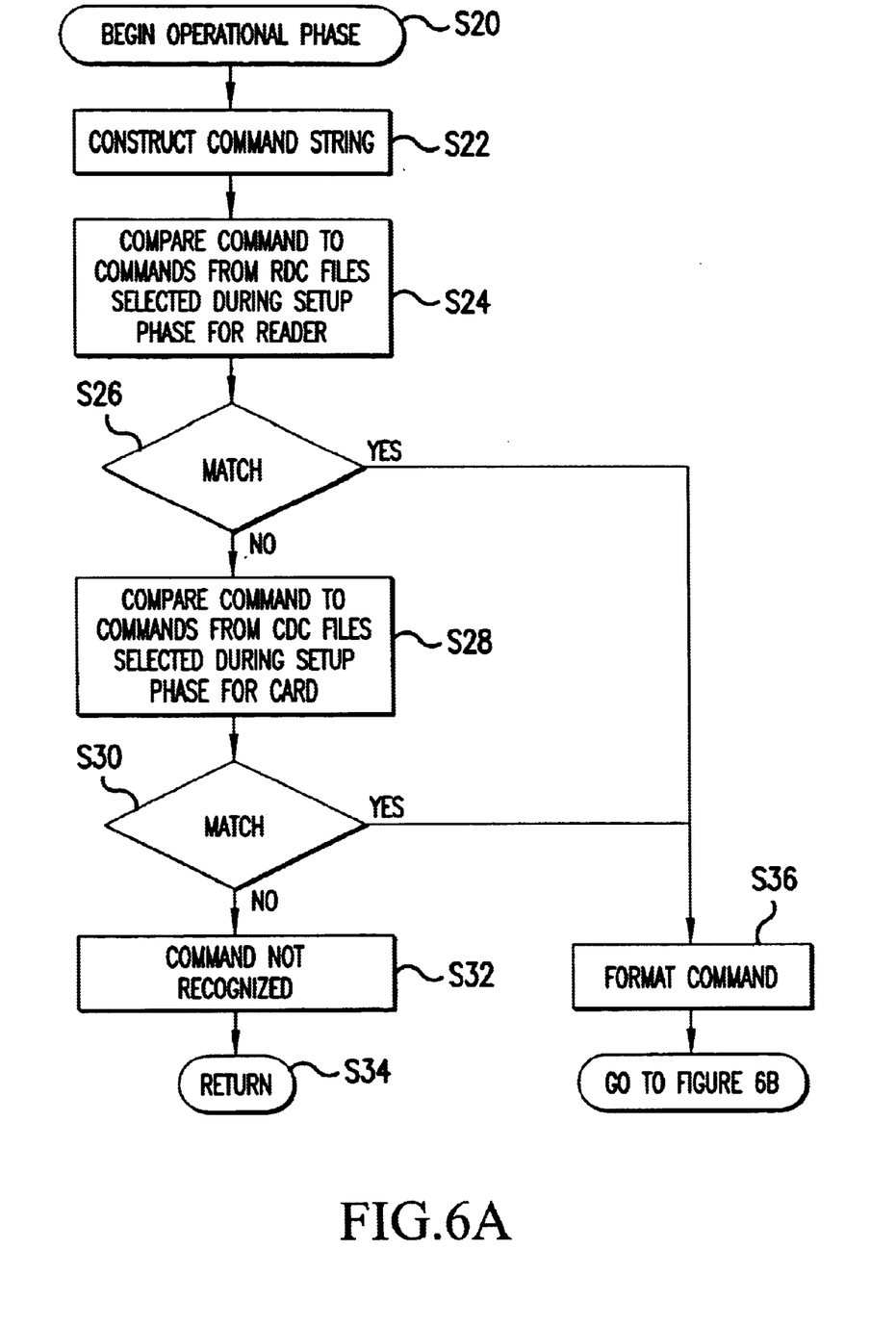
FIGS. 6a–6c illustrate the operational phase for constructing various commands to format the smart card and card reader.

The operational phase begins at Step S20 as shown in FIG. 6a. This is the phase where a user can select from the plurality of prestored configuration files for a card or card reader, and can configure or reconfigure the software engine to desired specifications. During the operational phase, commands are assembled and executed in real time. Further, all Microsoft Windows messaging, including external port activation, response routing and error handling, are easily processed.

In the setup phase, one of a plurality of prestored reader configuration and card configuration files are selected based upon a type of reader and/or card to be formatted or otherwise communicated with, wherein the selected file is stored in dynamic memory 330 of the software tool 300. During the operational phase process, at least one desired card and/or reader command is selected. The at least one selected card and/or reader command is then formatted and stored in memory of the respective card and/or card reader, namely in memory 220 and/or 120 as shown in FIGS. 3 and 2, respectively. The card and/or card reader can then be formatted or reprogrammed based upon the files stored in memory therein.

More specifically, once the operational phase begins in Step S20, the system proceeds to Step S22 wherein a command string is constructed. A command string denotes user specification of a CDC or RDC file. A single command line can be used within an application code to instruct the component to process and send the command, as well as handle any response information. The component accepts an English-like command with associated parameters and converts it into an instruction having a series of numeric valves, for example, hex values for transmission to the reader. For example, in Step S22, the command string: TSmTool.ExecuteCommand([cmdname,parameter list]); wherein "cmdname" is the command to be executed and "parameter list" is the comma separated information required to correctly process the command. The process then proceeds to Step S24 of FIG. 6a.

In Step S24 of FIG. 6a, the constructed command string is compared to commands from the RDC file selected during the setup phase based upon the type of reader to be formatted, and stored in dynamic memory 330. In Step S26, it is thereafter determined whether or not the constructed command string, which is used to select at least one of the card reader files, matches the commands of the RDC file selected during the setup phase and stored in dynamic memory 330. If not, then in Step S28, the command string constructed in Step S22 is compared to commands from the CDC file selected during the setup phase. The configuration file is selected based upon the type of card to be formatted and is also stored in dynamic memory 330. In Step S30, it is determined whether or not the constructed command string matches the commands of the CDC file stored in dynamic memory 330 based upon the type of card to be formatted to determine whether or not the constructed command string is being used to select at least one card command. If not, then in Step S32, the command is not recognized and in Step S34, the process is returned to await a new command string.

If the command string of Step S22 does match either a command in a stored RDC file in Step S26 or a command in a stored CDC file in Step S30, then the command can be formatted in Step S36 of FIG. 6a. More specifically, tag command information that correspond to the match found in Step S26 or Step S30 is determined such as instruction information, unique error information, response time/length information, etc. Then, every character of the instruction tag is looped through. Place holders are substituted with actual values from the parameter list. Those place holder names that begin with the letter "X" are entered as literal hex values, and those numbers that begin with "Z" are translated to ASCII equivalents. Thereafter, other command formatting procedures are stepped through as determined by appropriate sections in the reader and/or card configuration file. Preface information is then added to the command including: reader/card. NAD and length byte(s). If appropriate, an EOT byte is added.

Thereafter, reader additions for card IN/OUT types commands, as determined by the stored configuration file, are added. If required, transport layer protocol (TLP) is added as required. TLP converts each byte into two ASCII characters to prevent equipment from interpreting any control characters. Finally, an appropriate epilogue is calculated-error byte(s). This is typically the bitwise XOR calculation as defined by EDC type parameters in the reader RDC configuration file. This error byte is often added to the end of the command string and used for transmission verification. The transmitting and receiving of the command will now be described as follows with regard to FIG. 6b.

Figure 6B:
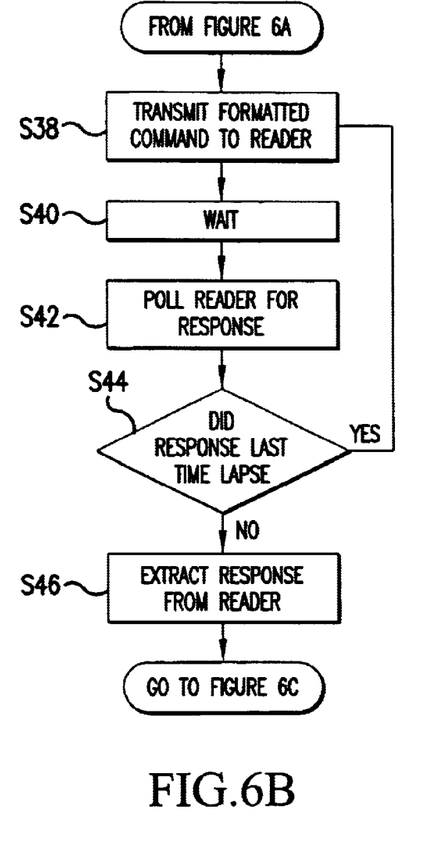

Once a command has been formatted in Step S36, the formatted command is then transmitted to the reader (or card) in Step S38. A wait stage is entered in Step S40. In Step S42, the communication port buffer of the software tool (workstation) 300 is continuously polled for a response from the reader (or card). In Step S44, it is determined whether or not a predetermined response time has lapsed without feedback from the reader (or card). If the response time has lapsed, error checking for time-out occurs and the system proceeds back to Step S38. If the time has not lapsed and a response has been received, then in Step S46 a response from the reader (or card) is extracted from the communication port buffer. Data is then preprocessed (EX.reverse TLP if appropriate) to get ready for the response analysis. Any communication port errors are deciphered and the process proceeds to FIG. 6c.

Figure 6C:
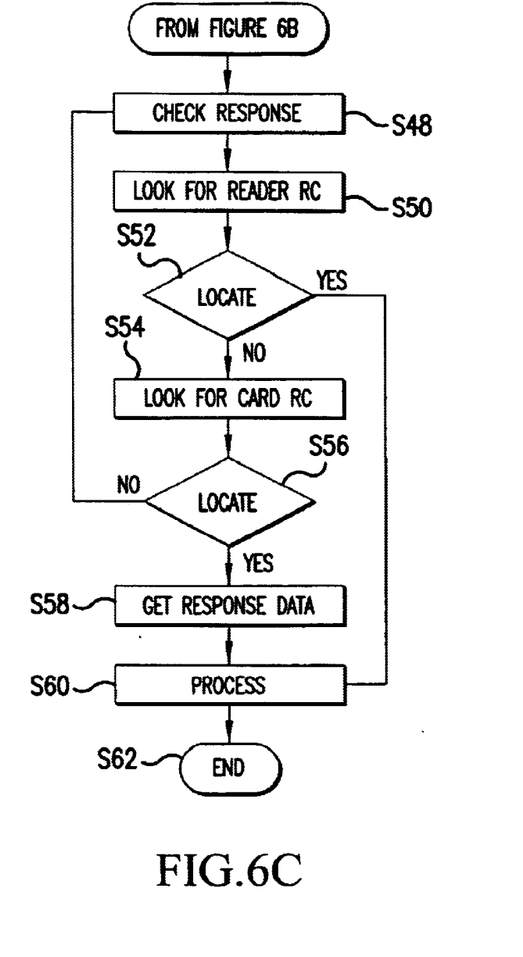

In FIG. 6c, the process for handling the response is described. Initially, in Step S48, the response is checked. Specifically, post NAD and EDC are verified to determine that they are correct. An incorrect match could indicate a transmission problem. If a problem occurs, an attempt is made to request that the reader resend the response.

In Step S50, the system looks for a reader return code (RC). The location of this byte(s) is defined by the reader configuration file (RDC). If an error occurs, then the RC is matched with common reader errors. If no match occurs, and the command is a reader level command, then the process continues to check for unique errors. The reader RC is located, or not, in Step S52.

If the reader RC is not located in Step S52, then the system moves to look for a card command and then continues to evaluate a response for card processing information. Specifically, a card RC (return code) is looked for in Step S54. If the card RC is not okay, then it is compared against common card errors and errors that might be unique to the command that has been issued. The card RC is located, or not, in Step S56.

If a card RC is located in Step S56, then the system moves to Step S58 wherein response data is obtained. If a card command has been issued, then response data must be obtained. For example, if the card command that had been issued was to read the first file in the card, then the response data segment would be the contents of file one. This also requires that the response be converted ASCII.

Thereafter, if a reader RC or card RC was located, the command is processed in Step S60. The commands are stored in the appropriate memory 120 or 220 of the card reader 100 or smart card 200 and are used to format the card reader or smart card of one final note is that during the processing step in Step S60, the properties RtnData, RtnCode, RtnStatus, RtnSent are populated with the status information to allow the application to check if a command was processed, and how it was processed. Thereby, the reader or card are formatted.

During the operational phase, a single command line can be used within an application code to instruct the component to process and send a command, as well as handle any response information. The component accepts an English-like command with associate parameters and converts it to a series of hex values for transmission to a reader. The following example is as follows:

Using the component, namely software tool 300, a software developer could write the following line to verify if the first secret code stored on a smart code is in fact the word "test code": ExecuteCommand [(CrdPresentCode, "1", "test code")].

If the aforementioned instruction was intended for one particular card being read by a specific reader, the component would automatically translate the command and send a series of hex bytes to the card reader through a communications port of the software tool 300 as follows: [65 0D 00 20 00 01 08 74 65 73 74 63 6F 64 65 5B]. The component translates the response [56 04 00 20 98 04 EE] to mean "incorrect secret code", which is then returned to the application of the developer.

Now, assuming that during the setup phase, an RDC configuration file and a CDC configuration file were instead loaded for another reader and card, respectively. To perform the same function, the series of bytes sent to the reader would be, for example: [36 30 30 45 31 34 30 30 34 32 30 30 30 31 30 38 37 34 36 35 37 33 37 34 36 33 36 46 36 34 36 35 32 41 03]. The response bytes received from the reader would then prompt the component to reapply with the "incorrect secret code" status.

It should be noted that this software code remains exactly the same and an identical response is generated even though a different reader and card are used. The software developer does not need to be concerned with the complexities of how these commands are assembled.

From an application user perspective, it should be noted that how a product that is built on the card methodology, for example, an EZ card methodology, would appear to an end user is dependent on the type of application. Frequently, applications built on EZ card methodology will perform dedicated tasks. For example, a front desk module in a hotel system would be limited to issuing new cards to arriving guests. It should be noted, that although smart cards are discussed in connection with the present application, other cards such as magnetic stripe cards, memory chip cards, and COS cards can also be used.

Some features are common to all applications of the EZ card methodology. Specifically, applications would require the following steps at a minimum: a reader would have to be connected to a host software tool 300 through a communications port; MS windows would have to be started; a program would have to be run; a configuration (set up) option to select which CDC and RDC files match the type of card and reader being used would have to take place; the reader would have to be powered on; the card would have to be powered on; and one or more of the reader and card functions or commands would have to be performed to format the card and reader. Examples include: create file/directory structures, read files, update files, authenticate codes, review file status, implement security schemes/access conditions, etc.

Regarding the formatter operation, the software tool includes a formatter, herein referred to as an EZ formatter, that is a typical utility program built on the EZ card methodology. It provides an easy way to interact with readers and cards. The EZ formatter can be used: 1) to format blank cards; 2) to personalize cards; 3) in training; 4) in front end to demo systems; 5) to verify card authenticity; and 6) to test card security schemes, for example. A tool status bar at the top of the screen provides global function (example reset card and reader) and status information (example active directory/file). The application has five screen pages that can be selected via notebook tabs. Each page represents a different grouping of functions.

A first type of page is a configuration page. This page is used to set RDC and CDC reader and card configuration files to be used (based upon card/card reader type). It also selects the type of communication between the reader and host work station (such as a serial port number, parallel port, PCMCIA, etc.). A second type of page is a security page. All secret codes are created and verified here. Codes can also be changed or unblocked as appropriate. Directory/file status and access conditions can be reviewed.

Template pages are a third type of page which define and create directory/file structures on smart cards. Structures can be saved to disk and retrieved for the future. When creating a new file or directory, the user is prompted for a file type, length, address, and access conditions. Files can also be deleted. A card viewer page is another type of page wherein the card viewer page is used to write and to read from selected files. The card viewer page can be used to dump the contents of an entire card. Finally, a writable area page can be used, however this page is relevant only from memory cards. The page shows a visual map of the card-to-memory addresses including which cards have been written and which cards are still unused.

CDC and RDC Configuration File Specifications

This section describes the structure and allowable formats for configuration files (referred to as CDC and RDC files) that are compatible with the preferred embodiments of the invention.

The CDC an RDC files are formatted similar to MS Windows in files. A unique CDC and RDC file is required for every card and reader type that is to be used.

File Structure

The general format follows the Windows in structure. Section headings are in brackets. Under each section parameter, names are listed (one per line) followed immediately by an equals sign and the associated data value. For example:

[Section Heading]
Parameter1=Value1
Parameter2=Value2
.
.
.
[Section2 Heading]
ParameterX=ValueX
. . . .

All CDC and RDC files contain the following required six sections:
AUTHOR
PRODUCT
COMMUNICATION PROTOCOL
TRANSMISSION
RECEIVE
COMMANDS Additional sections may then follow, such as one for each command listed in the COMMANDS section. For example, a reader type RDC file that defines two commands (readeron, readeroff) in the COMMANDS section will have two additional sections [READERON] and [READEROFF] that list the respective functional information.

Parameter names and values must be located under the correct Section heading. Not all CDC and RDC files will have the same parameter names. Differences between reader and cards are: represented by variations within the CDC and RDC files. To be understood correctly by the EZ Card System, data values must conform to the defined standards (See Contents and Descriptions).

Contents and Descriptions
Product Type defines the parameters as valid for a reader, card, or both.
Allowable Values are typically one of the following:
  (1) Integer: Positive whole numbers (up to 4 digits)
  (2) String: Collection of characters not to exceed length of 255
  (3) Specific: Exact entries are shown in italics
  (4) Hex: Two digit hex values. When there is more than one, the members of the series should be separated by a single space. For example: RC Success=90 00
  (5) ErrFormat: hex, comma, space, error description. For example:
    Common Error1=92 00, Write Problem in EEPROM
    Common Error2=98 04, Required secret code not presented.
Description explains how the values are interpreted by EZ Card System.
Author: This section identifies the source and/or author of the CDC and RDC file.
Creation Date
  Product Type: All
  Allowable Values: string
  Description: Date of CDC and/or RDC file.
Company
  Product Type: All
  Allowable Values: string
  Description: Name of company which created CDC and/or RDC file.
Individual
  Product Type: All
  Allowable Values: string
  Description: Name of individual which created CDC and/or RDC file.
Comment
  Product Type: All
  Allowable Values: string
  Description: Additional information (ex. Phone/email of individual)
Product This section identifies the product to which the CDC and/or RDC file pertains.
Name
  Product Type: All
  Allowable Values: string
  Description: Brand name of product
Manufacturer
  Product type: Both
  Allowable Values: string
  Description: Name of Manufacturer of product for which the CDC and/or RDC files have been configured.
Type
  Product Type: Both
  Allowable Values: 1, 2, 3
  Description: Identifies the CDC and/or RDC file as that for a:
    reader—1
    smart card—2 or
    PCMCIA card—3 (future)
Communication Protocol: This section contains parameter information needed to initiate a communication link to the host. A Serial RS232 port interface can be used for readers. Alternatives include PCMCIAN, parallel, and keyboard port interfaces.
Reader Type
  Product Type: Reader Only
  Allowable Values: PCMCIA, SERIAL, PASSTHRU
  Description: Define the reader to be used.
Baud
  Product Type: Reader Only
  Allowable Values: 9600, 14400, 19200, 38400
  Description: Defines the speed at which the reader will operate.
Parity
  Product Type: Reader Only
  Allowable Values: even, odd, none, mark, space
  Description: Defines the parity bit for reader communication.
Databits
  Product Type: Reader Only
  Allowable Values: 7, 8
  Description: Defines the data bit for reader communication.
Stopbits
  Product Type: Reader Only
  Allowable Values: 0, 1, 2
  Description: Define the stop bit(s) for reader communication.
Card Type
  Product Type: Smart Card Only
  Allowable Values: COS, MEM, MAG Description: Identifies the card as a:
  Chip Card with Card Operating System—COS
  Memory card—MEM
  Magnetic stripe card—MAG
Memory Area
  Product Type: Smart Card Only
  Allowable Values: SFN, CAF, parameterized range, or integer
  Description
    1. For MEM cards, the writable area is given as a parameterized range. Start address and length of area, repeat as necessary with pairs separated by commas. For example: a memory card that has two writable areas . . . the first from byte 1 to byte 50, the second from byte 75 to 100 would be as follows: Memory Area=1 49, 75 24
    2. For MAG cards this integer value will list how many tracks the card supports.
    3. For COS cards this identifies how new files are created
      System assigns File Names—SFN or
      Card Allocates Files—CAF
Transmission This section defines how command strings are constructed and transmitted to the reader/card. Information includes command composition, address identifiers, and error detection techniques.
Reader NAD
  Product Type: Reader Only
  Allowable Values: Hex
  Description: Node address of the reader
Card NAD
  Product Type: Reader Only
  Allowable Values: Hex
  Description: Node address of the card. Used to direct commands through the reader to the card.
EDC Type
  Product Type: Reader Only
  Allowable Values: 1, 2, 3, 4
  Description: identifies how much of command string should be XOR in order to arrive at correct error byte:
    entire string—1
    ignores NAD—2
    ignores EOT—3
    ignore both NAD & EOT—4
Two Pass ACK
  Product Type: Selected Readers
  Allowable value: Hex
  Description: Acknowledgement hex value returned by those readers that send ACK prior to processing command (2 pass protocol).
EOT Flag
  Product Type: Selected Readers
  Allowable value: Hex
  Description: End of Transmission code that is added to command string.
Composition Type
  Product Type: All (currently used for Readers only)
  Allowable Values: O, TLP, TLP1, PCSC
  Description: identifies format which command strings:
    Normal—0
    Transport Layer Protocol. Each byte is transmitted into two ASCII characters—TLP
    Process data only—TLP1
Card Command In
  Product Type: Selected Readers
  Allowable Values: Hex
  Description: Code that must preface card levels commands that send data to the card.
Card Command Out
  Product Type: Selected Readers
  Allowable Values: Hex
  Description: Code that must preface card level commands that retrieve data from the card and send it out to the host.
Card Command T1
  Product Type: Selected Reader
  Allowable Values: Hex
  Description: Code that prefaces T=1 commands
Length Bytes
  Product Type: All
  Allowable Values: 0, 1, 2
  Description: identifies how many bytes are used for sending length byte. If 0 then product does not require a length byte.
Receive This section defines the structure of response as they are received back to the host.
Response NAD
  Product Type: Reader Only
  Allowable Values: Hex
  Description: Node address of response (host terminal)
RC Reader Location
  Product Type: Reader Only
  Value: Integer
  Description: Byte number after the NAD where the reader return code (RC) begins. For example, if the response for reader level commands is: NAD+LEN+RC+data+EDC, then the RC Reader Location would be 2.
RC Card Location
  Product Type: Reader Only
  Value: Integer or END
  Description: Byte number after the NAD where the card level return code begins. If the RC is always at the end of the response then this value should be "END".
RC Success
  Product Type: All
  Allowable Values: Hex—multiple allowable success codes are separated by command and a space. Example: RC Success=90 00, 60 90
  Description: The return code(s) that indicate a successful execution of a command.
CommonError* where * equals a sequentially increasing integer up to number of Errors to be listed.
  Product Type: All
  Allowable Values: ErrFormat
  Description: List of return codes and associated error messages.
Commands This section lists the possible commands.
Command* where* equals sequentially increasing integers up to number of commands to be listed.
  Product Type: All
  Value: String
  Description: These values are the command identifier names that will appear as CDC and RDC file section headings in the remaining sections of file.

Example:
    Command1=CrdPresentCode
    Command2=CrdReadFile

Two additional sections [CrdPresentCode] and [CrdReadFile] must be established to hold the command details.

While the commands can be completely customized by the CDC and RDC file author, a suggested convention is to include the following commands at a minimum.

For Reader RDC file: RdrReset,RdrOff,RdrStatus.
For Card CDC file: CrdPresentCode, CrdCreateFile, CrdReadFile, CrdWriteFile,
CrdStatus.

[Command Identifier] Each command listed in the Commands Section will have its own separate section to describe the details of the command (instruction, errors, response time/length)

Type
  Product Type: All
  Allowable Values: 0, 1, 2, 3
  Description: Defines command exchange
    0—normal exchange of bytes
    1—reader command controlled by serial
    2—single byte at a time
    3—chained command Instruction
  Product Type: All
  Allowable Values: Hex/Special
  Description: Actual sequence of bytes that formulate the command. The Instruction is the sequence of hexadecimal bytes that is sent to the reader/card. In many instances the Instruction will contain placeholders for additional information that must be added by the application for the command to be correctly constructed. For example, consider the command named "CrdPresentCode." The Gemplus COS card representation is:
    Instruction=00 20 00 xnum 08 zcode
where xnum represents the number of the secret code to be presented and zcode represents the actual code. Placeholders prefaced with the letter "x" pass their value as a hex. Placeholders prefaced with the letter "z" pass their actual character value. When the above instruction is called from an EZ Card System application with the additional parameters "1" and "usercode", the component appends the hex representation of bytes to read:
    00 20 00 01 08 75 73 65 72 63 6F 64 65

Response Time
  Product Type: All
  Allowable Values: Integer
  Description: Time in milliseconds that host should wait for response. After the elapsed time, host will consider that an error has occurred and return a time-out.

Response Length
  Product Type: All
  Allowable Values: Integer or Open
  Description: Expected length of response data to be received by host. This is in addition to the normal return codes and error checks. Many commands like writing to a file and turning off a reader producing no response (i.e. Response Length=0). Commands lacking a predetermined response, for example, reading a file, will have a Response Length=Open Error* where * equals sequentially increasing integers up to number of unique errors for this command (max 8)
  Product Type: All
  Allowable Values: ErrFormat
  Description: Possible errors, unique to this specific command, that may be encountered during execution. Up to eight separate unique errors can be stored for each command.

Comment
  Product Type: All
  Allowable Values: string
  Description: Store hint regarding implementation of the command. Not actively used by EZ Card System.

Figure 7:
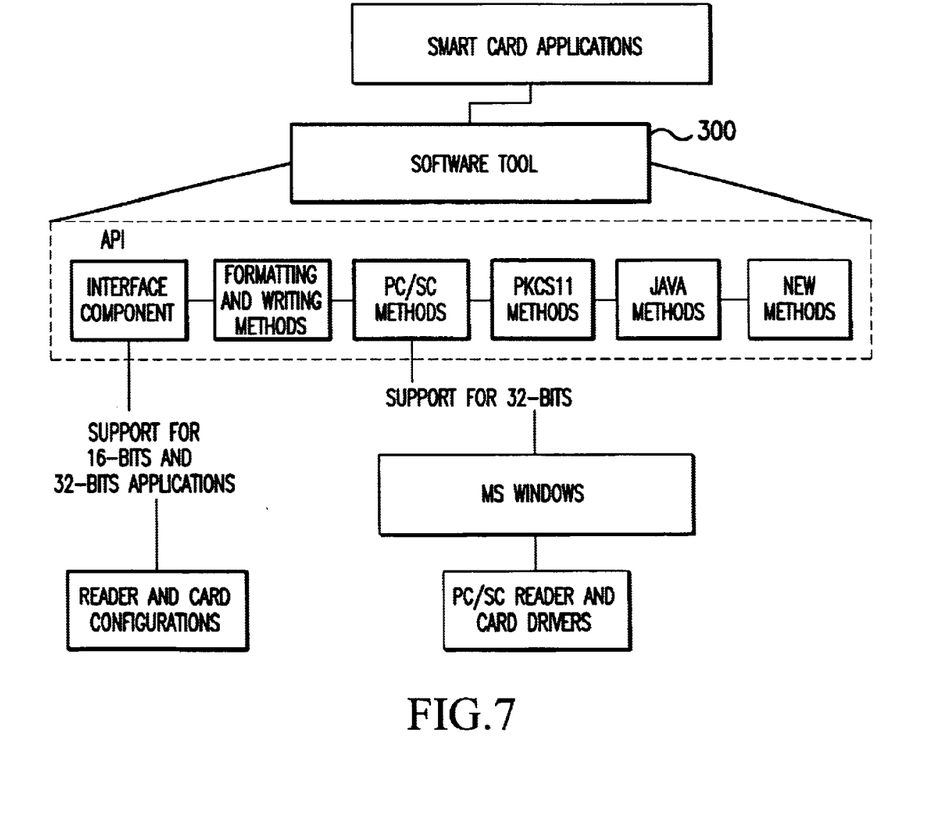
FIG. 7 illustrates an interfacing architecture and accessing methodology that incorporates the software tool in accordance with an embodiment of the present application.

FIG. 7 illustrates an interfacing architecture that includes the software tool described above. The application Programming Interface (API) 400 or accessing methodology kernel, includes higher level card functions, such as a series of Dynamic Link Libraries (DLLs) that may be called from products, software applications or solutions developed by outside users. This accessing methodology, which calls on any of the appended library modules to process commands, includes but is not limited to methods to format and write data manage card and reader properties, control the registration and operation of add-in modules, instruct and transmit commands, and receive and interpret card return codes.

The accessing methodology manages all interfacing with readers and cards. This includes constructing the commands that are to be directed to the card. Commands are converted to a data stream of hexadecimal bytes that are typically transmitted out the computer's communication port, like the RS232, to an attached reader and then forwarded on to the card. The card will then generate a reply and pass these response hexadecimal bytes back up to the computer or host. Also included in the accessing methodology are the interpretation of response codes, MS Windows system messaging, and reader/card error and exception handling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for configuring a software tool interface, between a card and a card reader, comprising:

accessing one of a plurality of card configuration records for configuring a software tool interface to communicate with the card;

accessing one of a plurality of reader configuration records for configuring the software tool interface to communicate with the card reader and configuring the software tool interface, between the card and card reader, for communicating with the card and card reader based upon the respective accessed card and card reader configuration records.

2. The method of claim 1, further comprising:

accessing another one of the card configuration records; and reconfiguring the software tool interface for communicating with another card based upon the accessed another card configuration record.

3. The method of claim 2, wherein the cards are smart cards.

4. The method of claim 1, further comprising:

accessing another of the reader configuration records; and reconfiguring the software tool interface for communicating with another card reader based upon the stored another reader configuration record.

5. The method of claim 1, wherein the card is a smart card.

6. The method of claim 1, further comprising:

accessing at least one first command based upon the card configuration record;

accessing at least one second command based upon the reader configuration record;

formatting the card based upon the at least one first command; and formatting the card reader based upon the at least one second command.

7. The method of claim 6, further comprising:

formatting and storing the at least one first command; and formatting and storing the at least one second command.

8. The method of claim 7, wherein the at least one formatted first command is stored on a card memory and the at least one formatted second command is stored on a card reader memory.

9. A software tool interface, between a card and card reader, for formatting the card and card reader, comprising:

a first memory for prestoring a plurality of card configuration records and a plurality of card reader configuration records for configuring the software tool interface, between the card and card reader, to communicate with the card and the card reader;

accessing means for accessing one of the plurality of prestored card configuration records and card reader configuration records based upon a respective card and card reader type;

a dynamic memory for storing the accessed card and card reader configuration records, wherein the software tool interface is configured based on at least one of the stored card and card reader configuration records, the accessing means further accessing a command for formatting at least one of the card and card reader; and processing means for formatting at least one of the card and card reader based on the respective accessed command.

10. A software tool interface between a card and card reader, comprising means for accessing one of a plurality of card configuration records for configuring a software tool interface to communicate with the card;

means for accessing one of a plurality of reader configuration records for configuring the software tool interface to communicate with the card reader; and means for configuring the software tool interface, between the card and card reader, for communicating with the card and card reader based upon the respective accessed card and card reader configuration records.

11. The software tool interface of claim 10, further comprising:

introducing means for adding a new command for one of the accessed card and card reader configuration records; and updating means for reconfiguring the one accessed configuration record based on the new command.

12. A method for configuring a software tool interface, between a card and card reader, for communicating with the card and card reader, comprising the steps of:

prestoring a plurality of files for configuring a software tool interface to communicate with the card as a plurality of card configuration files;

prestoring a plurality of files for configuring the software tool interface to communicate with the card reader as a plurality of reader configuration files;

selecting one of the card configuration files;

selecting one of the reader configuration files;

storing the selected card configuration file and reader configuration file; and configuring the software tool interface between the card and card reader, for communicating with the card and card reader based upon the respective stored selected card and card reader configuration files.

13. The method of claim 12, further comprising the steps of:

selecting another one of the card configuration files;

storing the another card configuration file in place of the stored card configuration file; and reconfiguring the software tool interface for communicating with another card based upon the stored another card configuration file.

14. The method of claim 13, wherein the cards are smart cards.

15. The method of claim 13, further comprising the steps of:

selecting another of the reader configuration files;

storing the another of the reader configuration file in place of the stored reader configuration file; and reconfiguring the software tool interface for communicating with another card reader based upon the stored another reader configuration file.

16. The method of claim 12, wherein the card is a smart card.

17. The method of claim 12, further comprising the steps of:

selecting at least one first command based upon the card configuration file;

selecting at least one second command based upon the reader configuration file;

formatting the card based upon the at least one first command; and formatting the card reader based upon the at least one second command.

18. The method of claim 17, further comprising the steps of:

formatting and storing the at least one first command; and formatting and storing the at least one second command.

19. The method of claim 18, wherein the at least one formatted first command is stored on a card memory and the at least one formatted second command is stored on a card reader memory.

20. A software tool interface between a card and a card reader, for formatting the card and card reader, comprising:

a first memory for prestoring a plurality of card configuration files and a plurality of card reader configuration files for configuring the software tool interface to communicate with the card and the card reader;

selection means for selecting one of the plurality of prestored card configuration files and card reader configuration files based upon a respective card and card reader type;

a dynamic memory for storing the selected card and card reader configuration files, wherein the software tool interface, between the card and card reader, is configured based on at least one of the stored card and card reader configuration files, the selection means further selecting a command for formatting at least one of the card and card reader;

at least one of a card memory and a card reader memory that stores the selected command in the respective card and card reader; and processing means for formatting at least one of the card and card reader based on the respective selected and stored command.

* * * * *